United States Patent
Struck et al.

(10) Patent No.: US 7,091,273 B2
(45) Date of Patent: Aug. 15, 2006

(54) PROCESS FOR PREPARING A POLYMER DISPERSION

(75) Inventors: Oliver Struck, Düren (DE); Christian Przybyla, Duisburg (DE); Achim Sieger, Düren (DE); Mathias Hahn, Wilhelmshorst (DE); Dirk Ruppelt, Potsdam (DE); Werner Jaeger, Kleinmachnow (DE)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 10/430,422

(22) Filed: May 7, 2003

(65) Prior Publication Data

US 2003/0212183 A1    Nov. 13, 2003

(51) Int. Cl.
  *C08F 2/16*    (2006.01)
  *C08F 2/20*    (2006.01)
  *C08F 2/24*    (2006.01)
  *D21H 17/45*   (2006.01)

(52) U.S. Cl. .................. 524/458; 289/501; 289/517; 289/521; 289/523; 289/815; 289/827; 289/831

(58) Field of Classification Search .............. 524/458, 524/501, 521, 517, 523, 815, 827, 289, 831
See application file for complete search history.

(56) References Cited

U.S. PATENT DOCUMENTS

| | | | |
|---|---|---|---|
| 4,929,655 A | 5/1990 | Takeda | 524/458 |
| 5,403,883 A | 4/1995 | Messner | 524/458 |
| 5,447,981 A | 9/1995 | Fock | 524/458 |
| 5,587,415 A | 12/1996 | Takeda | 524/458 |
| 5,597,859 A | 1/1997 | Hurlock | 524/458 |
| 6,133,368 A | 10/2000 | Hurlock | 524/521 |
| 6,221,957 B1 * | 4/2001 | Nzudie et al. | 524/815 |
| 6,262,168 B1 | 7/2001 | Huang | 524/521 |

FOREIGN PATENT DOCUMENTS

| | | |
|---|---|---|
| EP | 0169674 | 1/1986 |
| EP | 0170394 | 2/1986 |
| EP | 0183466 | 6/1986 |
| EP | 0364175 | 4/1990 |
| EP | 0525751 | 2/1993 |
| EP | 0630909 | 12/1994 |
| EP | 0637598 | 2/1995 |
| EP | 0657478 | 6/1995 |
| EP | 0717056 | 6/1996 |
| EP | 0831177 | 3/1998 |
| EP | 0877120 | 3/2000 |
| WO | 00/11052 | 3/2000 |
| WO | 00/11053 | 3/2000 |
| WO | 00/20470 | 4/2000 |
| WO | 01/18063 | 3/2001 |

\* cited by examiner

*Primary Examiner*—Kelechi C. Egwim
(74) *Attorney, Agent, or Firm*—White, Redway & Brown LLP

(57) ABSTRACT

The present invention relates to a process for preparing an aqueous polymer dispersion comprising: preparing a dispersant co-polymer of a monomer mixture (M) by polymerising the monomer mixture (M) in a reaction medium which is substantially free from organic solvents and/or substantially free from monomers which are not soluble in water, the monomer mixture (M) comprises at least one cationic vinyl monomer ($m_3$) and at least one monomer ($m_4$) which is tetrahydrofurfuryl acrylate, tetrahydrofurfuryl methacrylate, or a monomer of the general formula (I):

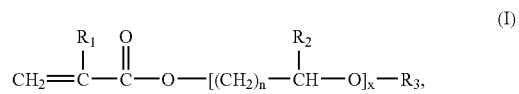

wherein $R_1$ is hydrogen or methyl, $R_2$ is hydrogen or $C_1$–$C_2$ alkyl, $R_3$ is hydrogen, $C_1$–$C_4$ alkyl, phenyl, or benzyl, n=1 to 4, and x=1 to 50, and then, polymerising one or more water-soluble monomers (m) in an aqueous solution of a salt in the presence of the obtained dispersant polymer. The invention also relates to an aqueous polymer dispersion, use of the dispersion and a process for the production of paper.

17 Claims, No Drawings

PROCESS FOR PREPARING A POLYMER DISPERSION

The present invention relates to a process for preparing a polymer dispersion. It also relates to a polymer dispersion, the use of the polymer dispersion and a process for producing paper.

BACKGROUND OF THE INVENTION

Aqueous dispersions of cationic polymers are, for example, used as retention aids in paper manufacturing industry. Other uses are, for example, as flocculants for treating wastewater, as thickeners, and soil improving agents. Generally, these polymer dispersions comprise a dispersed polymer and a dispersant in which the dispersant usually is a polymeric dispersant. These polymer dispersions can be prepared by polymerising a reaction mixture of water-soluble monomers in the presence of a salt. Finished polymer will precipitate from the aqueous salt solution and, by using a suitable dispersant, form a polymer dispersion.

There are a number of criteria that the polymer dispersion should fulfil to give good results in the final application and be of commercial interest. Such criteria are, for example, the process viscosity, active content, stability, good retention properties, and easiness of preparing the polymer dispersion including preparing the dispersant. Also, criteria such as environmental and safety aspects are of importance.

By process viscosity is meant the viscosity of the reaction mixture when producing the polymer dispersion. The viscosity should be kept low and viscosity peaks should be avoided, or at least reduced as much as possible, during the production of the polymer dispersion. EP 0330909 B1, discloses a process for preparing a dispersion of a water-soluble polymer comprising polymerising a water-soluble monomer in an aqueous reaction mixture containing a salt.

The shelf life of the dispersion, i.e., the stability of the polymer dispersion over time, is an important property. An efficient dispersant is needed for keeping the polymer particles stable in dispersion without settling as sediment. U.S. Pat. No. 6,221,957 discloses an aqueous saline polymer dispersion where the dispersant is based on a cationic polymer containing hydrophobic units. According to the document, the reason for imparting hydrophobic units is to. increase the viscosity of the dispersant polymer, which is said to improve the stability of the dispersion. However, a too high viscosity of the polymer dispersion is not beneficial to the end-application. Also, the inclusion of hydrophobic units in the dispersant polymer requires the dispersant to be produced in organic solvents such as ketones, alcohols and ethers. These solvents have to be removed before using the dispersant in aqueous. polymer dispersions, which requires additional processing steps. The organic solvents have also environmental drawbacks and can be inflammable which is negative from a safety point of view.

A further important factor to consider Is the active content, i.e., the amount of dispersed polymer in the polymer dispersion. A higher active content gives lower transportation costs and easier handling at the end-application. By using an efficient dispersant, dispersions with a higher active content can be obtained at the same time the viscosity can be kept low. However, it may be difficult to combine a high active content with good performance in retention and dewatering in a papermaking process.

The cationic charge of a dispersed polymer effects its ability to form stable dispersions. There exist reasons for providing stable polymer dispersions with a comparatively low cationic charge. Such reasons are, for example, FDA limits of cationic monomers for certain use, cost, risks of overcharging the cellulosic suspension when used in papermaking.

During preparation of a polymer dispersion, deposits of polymer may form and stick to the reaction vessel and stirrer. This leads to time consuming cleaning procedures of the reaction equipment.

It is an object of the present invention to provide a process for preparing a polymer dispersion in which the process viscosity is kept low and smooth during preparation without any large viscosity peaks, and which gives no deposits. There is a further object of the present invention to provide a polymer dispersion having high stability, high active content with comparatively low cationic charge, and which at the same time gives good retention when used in papermaking processes.

THE INVENTION

According to the invention it has surprisingly been found that a highly stable polymer dispersion having high active content of a dispersed polymer and low process viscosity can be achieved by a process for preparing an aqueous polymer dispersion according to the present invention. The process, according to the invention, comprises polymerising one or more water-soluble monomers (m) in an aqueous solution of salt in the presence of a dispersant polymer, wherein the dispersant polymer is a co-polymer of a monomer mixture (M) comprising at least one cationic monomer ($m_3$) and at least one monomer ($m_4$) which is tetrahydrofurfuryl acrylate, tetrahydrofurfuryl methacrylate, or a monomer of the general formula (I):

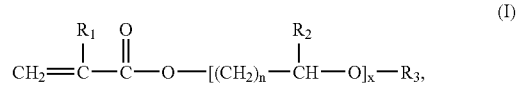

wherein $R_1$ is hydrogen or methyl, $R_2$ is hydrogen or $C_1$–$C_2$ alkyl, $R_3$ is hydrogen, $C_1$–$C_4$ alkyl, phenyl, or benzyl, n=1 to 4, and x=1 to 50, where, the monomer mixture (M) is being substantially free from monomers which are not soluble in water and/or the dispersant polymer is obtainable by polymerising the monomer mixture (M) in a reaction medium which is substantially free from organic solvents and/or the dispersant polymer is obtainable by polymerising the monomer mixture (M) in an aqueous reaction medium.

The invention further comprises an aqueous polymer dispersion obtainable by the process according to the invention.

The invention further comprises an aqueous polymer dispersion comprising: (a) a dispersed polymer, and, (b) a dispersant polymer which is a copolymer of a monomer mixture (M) comprising at least one cationic monomer ($m_3$) and at least one monomer ($m_4$) which is tetrahydrofurfuryl acrylate, tetrahydrofurfuryl methacrylate, or a monomer of the general formula (I):

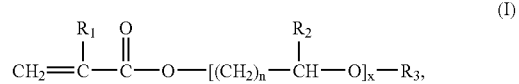

wherein R₁ is hydrogen or methyl, R₂ is hydrogen or $C_1$–$C_2$ alkyl, R₃ is hydrogen, $C_1$–$C_4$ alkyl, phenyl, or benzyl, n=1 to 4, and x=1 to 50, and, (c) a salt, where, the monomer mixture (M) is being substantially free from monomers which are not soluble in water and/or the dispersant polymer is obtainable by polymerising the monomer mixture (M) in a reaction medium which is substantially free from organic solvents.

The invention further comprises use of a polymer dispersion as retention aid for paper manufacturing, as thickening agent and/or as soil improvement agent.

Finally, the present invention comprises a process for the production of paper from an aqueous suspension containing cellulosic fibres, and optional fillers, which comprises adding to the suspension an aqueous polymer dispersion according to the invention, forming and draining the suspension on a wire.

The water-soluble monomers, (m), suitably comprise vinyl monomers, preferably a non-ionic monomer, (m₁), and a cationic monomer, (m₂). The non-ionic monomer, (m₁), is preferably a monomer of the general formula (II):

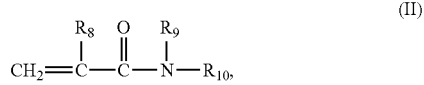

(II)

wherein R₈ is hydrogen or methyl, and R₉ and R₁₀ are, independently from each other, any of hydrogen, $C_1$–$C_2$ alkyl, or isopropyl. Preferred monomers (m₁) include acrylamide, methacrylamide, N-isopropylacrylamide, N-isopropylmethacrylamide, N-t-butylacrylamide, N-t-butylmethacrylamide, N-methylolacrylamide, and N-methylolmethacrylamide.

The cationic monomer, (m₂), is preferably a monomer of the general formula (III):

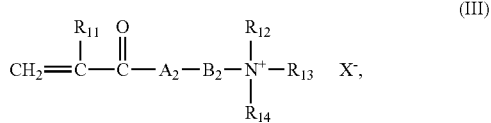

(III)

wherein R₁₁ is hydrogen or methyl, R₁₂, R₁₃ and R₁₄ are, independently from each other, any of hydrogen, $C_1$–$C_8$ alkyl or benzyl, A₂ is oxygen or NH, B₂ is $C_2$–$C_4$ alkyl or $C_2$–$C_4$ hydroxyalkyl, X⁻ is an anionic counterion, suitably a monovalent anion, e.g. chloride. Preferred monomers (m₂) include acryloyl-oxyethyl-trimethylammoniumchloride (ADAM), acryloyloxyethyl-benzyldimethyl-ammoniumchloride (ADAMBQ), methacryloyloxyethyl-trimethylammoniumchloride (MADAM), methacryloyl-oxyethyl-benzyldimethylammonium-chloride (MADAMBQ), acrylamidopropyl-trimethylammoniumchloride (TMAPM), acrylamidopropyl-benzyl-dimethylammoniumchloride (BDMAPAA), methacryl-amidopropyl-trimethylammonium-chloride (TMAPMA), and methacrylamidopropyl-benzyldimethytammoniumchloride (BDMAPMA).

The molar ratio between monomer (m₁) and monomer (m₂) is suitably from about 95:5 to about 50:50, preferably from about 94:6 to about 70:30, most preferably from about 92:8 to about 85:15.

The weight average molecular weight of the dispersed polymer is suitably from about 1,000,000 to about 15,000,000 g/mole, preferably from about 5,000,000 to about 10,000,000 g/mole, most preferably from about 6,000,000 to about 9,000,000 g/mole.

In one aspect of the invention, the dispersant polymer is made by polymerising the monomer mixture (M) in a medium which is suitably substantially free from organic solvents. By "substantially free from organic solvents" is herein meant that the medium comprises from 0 to about 10 weight % of organic solvents, suitably from 0 to about 5 weight %, preferably from 0 to about 1 weight %.

In another aspect of the invention, the dispersant polymer is made by polymerising the monomer mixture (M) in a medium which is suitably substantially free from monomers which are not soluble in water. By "substantially free from monomers which are not soluble in water" is herein meant that the monomer mixture comprises from 0 to about 0.5 weight % of monomers which are not soluble in water, suitably from 0 to about 0.1 weight %, preferably from 0 to about 0.001 weight %, based on the total amount of monomers.

The aqueous solution of salt suitably comprises a polyvalent anion salt, preferably a salt belonging to the group of sulphates, or phosphates, such as sodium sulphate, ammonium sulphate, magnesium sulphate, sodium dihydrogen phosphate, diammonium hydrogenphosphate, dipotassium hydrogenphosphate, and methylsulphate salt. Most preferably, ammonium sulphate and sodium sulphate are used. Mixtures of two or more of these salts are also suitable. The concentration of salt, based on the amount of water, is suitably from about 1 to about 50 weight %, preferably from about 10 to about 40 weight %, most preferably from about 15 to about 35 weight %. Besides being present during the polymerisation, additional salt may also be added after polymerisation to reduce the viscosity of the polymer dispersion.

The cationic vinyl monomer (m₃) in the dispersant polymer suitably belongs to the group of diallyl-dimethylammoniumchloride (DADMAC), vinylpyridiniumchloride, N-vinylimidazoliniuimchloride, vinylbenzyl-trimethylammoniumchloride, and/or has/have the general formula (IV):

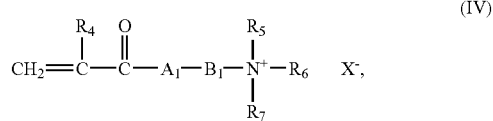

(IV)

wherein R₄ is hydrogen or methyl, R₅, R₆ and R₇ are, independently from each other, any of hydrogen, $C_1$–$C_8$ alkyt, or, benzyl, A₁ is NH or oxygen, B₁ is $C_1$–$C_2$ alkyl or $C_1$–$C_2$ hydroxyalkyl, X⁻ is an anionic counterion, suitably a monovalent anion, e.g. chloride. Preferred monomers ma include acryloyl-oxyethyl-trimethylammoniumchloride (ADAM), acryloyloxyethyl-benzyldimethyl-ammoniumchloride (ADAMBQ), methacryloyloxyethyl-trimethylammoniumchloride (MADAM), methacryloyloxyethyl-benzyldimethylammonium-chloride (MADAMBQ), acrylamidopropyl-trimethyl-ammoniumchloride (TMAPAA), acrylamidopropyl-benzyl-dimethylammoniumchloride (BDMAPAA), methacryl-amidopropyl-trimethylammoniumchloride (TMAPMA), and methacrylamidopropyl-benzyl-dimethylammoniumchloride (BDMAPMA). The dispersant polymer suitably comprises from about 80 to about 99.9 mole % of monomer(s) which is/are belonging to the group of cationic monomers, $m_3$, preferably from about 90 to about 99 mole %, most preferably from about 92 to about 98.5 mole %.

Preferred monomers ($M_4$) in the dispersant polymer belong to the group of monofunctional vinylendcapped ethers and monofunctional vinylendcapped polyethers, are suitably amphiphilic, and include tetrahydrofurfuryl acrylate, tetrahydrofurfuryl methacrylate, butyl diglycol methacrylate, methoxypolyethylene glycol methacrylate, poly (ethylene glycol) phenyl ether acrylate, poly(ethylone glycol) methyl ether acrylate (M-PEG acrylate), poly(ethylene glycol) methyl ether methacrylate (M-PEG methacrylate), ethylene glycol phenyl ether acrylate, ethylene glycol phenyl ether methacrylate, di(ethylene glycol) ethyl ether acrylate, di(ethylene glycol) ethyl ether methacrylate, ethylene glycol methyl ether acrylate, and ethylene glycol methyl ether methacrylate. The most preferred monomers ($m_4$) are poly(ethylene glycol) methyl ether acrylate (M-PEG acrylate) and poly(ethylene glycol) methyl ether methacrylate (M-PEG methacrylate). The dispersant polymer suitably comprises from about 0.1 to about 20 mole % of monomer(s) ($m_4$), preferably from about 1 to about 10 mole %, most preferably from about 1.5 to about 8 mole %.

The weight average molecular weight of the dispersant polymer is suitably from about 20,000 to about 5,000,000 g/mole, preferably from about 50,000 to about 3,000,000 g/mole, most preferably from about 100,000 to about 2,000,000 g/mole.

The polymerisation in the process of the invention is suitably a free-radical polymerisation. The initiator is suitably a radical former, preferably a water-soluble redox initiator or a water-soluble azo-initiator. Preferred initiators include dibenzoylperoxide, sodiummetabisulphite and 2,2'-azobis-(amidinpropan) hydrochloride.

According to the invention, the dispersant polymer is suitably produced in a reaction medium, which is substantially free from organic solvents, and can be added directly to the process of preparing the polymer dispersion without the need of any separation or purification steps. The dispersant polymer is suitably added to the process of preparing the polymer dispersion as a composition comprising a substantial part of the reaction medium in which it was produced. Suitably, from about 10 to about 100% of the original amount of reaction medium remains in the dispersant polymer composition, preferably from about 50 to about 100%, even more preferably from about 80 to about 100%, most preferably from about 95 to about 100%.

The polymer dispersion suitably comprises from about 5 to about 40 weight % of the dispersed polymer, preferably from about 10 to about 30 weight %, most preferably from about 12 to about 25 weight %. Furthermore, the polymer dispersion suitably comprises from about 0.2 to about 5 weight % of the dispersant polymer, preferably from about 0.5 to about 3 weight %, most preferably from about 0.8 to about 1.5 weight %.

The polymer dispersion may also comprise additional substances, such as cross-linkers and branching agents.

The polymerisation temperature when preparing the polymer dispersion may vary depending on, e.g., which monomers and polymerisation initiator are being used. Suitably, the polymerisation temperature is from about 30 to about 90° C., preferably from about 40 to about 70° C. The process is suitably a semi-batch process, i.e., the monomers (m) are both present from the beginning of the polymerisation process and further added at a later stage, either in one or more portions or continuously over a period of time during the reaction. The reaction mixture is suitably stirred during the polymerisation process at a stirring rate suitable for the process. Suitably, the stirring rate is from about 100 to about 1000 rpm.

The salt is suitably present from the beginning of the process according to the invention. An additional amount of salt can be added after the polymerisation has been completed in order to reduce the viscosity of the polymer dispersion. Alternatively, a cationic polyelectrolyte can be added after the polymerisation has been completed. The cationic polyelectrolyte is suitably a homo- or copolymer of one or more of DAEDMAC, ADAM MC Q and ADAM BZ Q, and has a weight average molecular weight of suitably from about 1,000 to about 500,000 g/mole, preferably from about 5,000 to about 100,000 g/mole.

In a preferred embodiment of the invention, a dispersant is made which is a co-polymer of diallyl-dimethylammoniumchloride (DADMAC), acryloxyethyl-trimethyl-ammoniumchloride (ADAM MC Q), and poly-(ethylenglycol) methylether methacrylate (M-PEG-acrylate), which is used in a polymer dispersion where a co-polymer of acrylamide and acryloxyethyl-dimethylbenzylammoniumchloride (ADAM BZ Q) is the dispersed polymer.

When using the polymer dispersion, according to the invention, in papermaking processes, the dispersion is added to the suspension of cellulosic fibres, and optional fillers, to be dewatered in amounts which can vary within wide limits depending on, inter alia, type and number of components, type of furnish, filler content, type of filler, point of addition, etc. The dispersed polymer is usually added in an amount of at least 0.001%, often at least 0.005% by weight, based on dry substance in the stock to be dewatered, and the upper limit is usually 3% and suitably 1.5% by weight. The, polymer dispersion according to the invention is suitably diluted before adding it to the cellulosic suspension. Further additives which are conventional in papermaking can of course be used in combination with the polymer dispersion according to the invention, such as, for example, silica-based sols, dry strength agents, wet strength agents, optical brightening agents, dyes, sizing agents like rosin-based sizing agents and cellulose-reactive sizing agents, e.g. alkyl and alkenyl ketene dimers, alkyl and alkenyl ketene multimers, and succinic anhydrides, etc. The cellulosic suspension, or stock, can also contain mineral fillers of conventional types such as, for example, kaolin, china clay, titanium dioxide, gypsum, talc and natural and synthetic calcium carbonates such as chalk, ground marble and precipitated calcium carbonate. The term "paper", as used herein, of course include not only paper and the production thereof, but also other cellulosic fibre-containing sheet or web-like products, such as for example board and paperboard, and the production thereof, The process can be used in the production of paper from different types of suspensions of cellulose-containing fibres and the suspensions should suitably contain at least 25% by weight and preferably at least 50% by weight of such fibres, based on dry substance. The suspension can be based on fibres from chemical pulp such as sulphate, sulphite and organosolv pulps, mechanical pulp such as thermome-chanical pulp, chemo-thermomechanical pulp, refiner pulp and groundwood pulp, from both hardwood and softwood, and can also be based on recycled fibres, optionally from de-inked pulps, and mixtures thereof.

The invention will now further be described in connection with the following examples which, however, not should be interpreted as limiting the scope of the invention.

EXAMPLES

Examples 1–5

Dispersant polymers were synthesised by polymerising aqueous mixtures of diallyl-dimethylammoniumchloride (DADMAC), acryloxyethyl-trimethylammoniumchloride (ADAM MC Q, and poly-(ethylenglycol) methylether acrylate (M-PEG-acrylate), The results were aqueous solutions of the dispersants of about 40 weight % dry content of dispersant polymer.

TABLE 1

Dispersant polymers

| Example | Monomer composition (mole %) | | | Weight average molecular weight* (g/mole) |
|---|---|---|---|---|
| | DADMAC | ADAM MC Q | M-PEG acrylate- | |
| 1 | 48.75 | 48.75 | 2.5 | 960.000 |
| 2 | 47.5 | 47.5 | 5.0 | 760.000 |
| 3 | 0 | 97.5 | 2.5 | 1.300.000 |
| 4 | 24.4 | 73.1 | 2.5 | 1,680,000 |
| 5 | 97.5 | 0 | 2.5 | 150.000 |

*Molecular weight of dispersant polymer determined by GPC

Examples 6–8

Dispersant polymers were also synthesised by polymerising aqueous mixtures of diallyl-dimethylammoniumchloride (DADMAC), acryloxyethyl-trimethylammoniumchloride (ADAM MC Q ), and different monomers ($m_4$) of the group monofunctional vinylendcapped ethers and polyethers. The monomer composition in all examples was 48.75 mole % DADMAC, 48.75 mole % ADAM MC Q, and 2.5 mol % amphiphilic monomer. Also here, the results of the polymerisation were aqueous solutions of the dispersants of about 40 weight % dry content of dispersant polymer.

TABLE 2

Dispersant polymers

| Example | Monomer | Weight average molecular weight* (g/mole) |
|---|---|---|
| 6 | M-PEG-methacrylate | 800.000 |
| 7 | Tetrahydrofurfurylmethacrylate | 1.050.000 |
| 8 | N-butoxymethylmethacrylamide | 1.100.000 |

*Molecular weight of dispersant polymer determined by GPC

Example 9 (Comparative)

A dispersant without any monomer $m_4$ was also synthesised by polymerising aqueous mixtures of diallyl-dimethylammoniumchloride (DADMAC), and acryloxyethyl-trimethylammoniumchloride (ADAM MC Q).

TABLE 3

Comparative dispersant

| Example | Monomer composition (mole %) | | Average molecular weight* (g/mole) |
|---|---|---|---|
| | DADMAC | ADAM MC Q | |
| 9 | 50 | 50 | 780.000 |

*Molecular weight of dispersant polymer determined by GPC

Examples 10–18

Polymer dispersions were prepared by polymerising monomer mixtures comprising acrylamide and acryloxyethyl-dimethylbenzylammoniumchloride (ADAM B Q), in the presence of a polymer dispersant. A mixture of 225.5 g water, 105.5 g acrylamide (50 wt %), 23.64 g acryloxyethyl-dimethylbenzylammoniumchloride (80 wt %), 2.6 g EDTA (5 wt %), 6 9 glycerine and 12.5 g of a 40 wt % dispersant according to Examples 1–9. 80 g ammoniumsulphate was added to the mixture. The temperature was raised to 50° C. and 4.1 mg of 2,2'-azobis-(-2-amidinopropane)-dihydrochloride was added. The polymerisation was proceeded for 1.5 hrs. Thereafter, 4.17 g acryloxyethyl-dimethylbenzylammoniumchloride was added to the mixture for 4 hours, followed by the addition of 25 mg of the initiator. After one hour of reaction at 50° C., 20 g ammonium-sulphate was added.

Application tests regarding retention and dewatering in papermaking processes were made. To a furnish of 4 g/L with a conductivity of 7 mS/cm was added 0.5 kg/t of dispersed polymer. The turbidity (NTU) and the retention time (s) was measured.

TABLE 4

Polymer dispersions

| Example | Dispersant | Active content (%) | Application test | |
|---|---|---|---|---|
| | | | Turbidity (NTU) | Retention time (s) |
| 10 | Ex. 1 | 15 | 56 | 10.8 |
| 11 | Ex. 2 | 20 | 60 | 11.7 |
| 12 | Ex. 3 | 15 | 53 | 10.9 |
| 13 | Ex. 4 | 20 | 58 | 11.5 |
| 14 | Ex. 5 | 15 | 62 | 10.6 |
| 15 | Ex. 6 | 20 | 55 | 10.8 |
| 16 | Ex. 7 | 23 | 68 | 11.5 |
| 17 | Ex. 8 | 23 | 66 | 11.5 |
| 18 (comparative) | Ex. 9 | 20 | 70 | 12.2 |

The process viscosity was low (lower than ~2000 mPas) for all disperions. It is concluded that the dispersions using dispersants according to the invention show better results in retention and dewatering.

Example 19–20 (Comparative)

Dispersant polymers were also synthesised by polymerising mixtures of diallyl-dimethylammoniumchloride (DADMAC), acryloxyethyl-trimethylammoniumchloride (ADAM MC Q), poly-(ethylenglycol) methylether acrylate (M-PEG-acrylate), and styrene in an aqueous solution.

TABLE 5

Dispersant polymers

Monomer composition (mole %)

| Example | DADMAC | ADAM MC Q | M-PEG acrylate | Styrene | Comments |
|---|---|---|---|---|---|
| 19 | 59 | 37.5 | 2.5 | 1 | turbid solution |
| 20 | 55 | 37.5 | 2.5 | 5 | solids in solution |

The dispersant solution was turbid at 1 mole % of styrene present, and at 5 mole % of styrene also solids were present. When testing these dispersants in the preparation of a dispersion according to Examples 10–18, there was a gel formation during the dispersion preparation in both cases. Thus, no useful dispersion was possible to prepare.

Example 21–22 (Comparative)

Dispersant polymers were synthesised by polymerising mixtures of diallyl-dimethylammoniumchloride (DADMAC), acryloxyethyl-trimethylammoniumchloride (ADAM MC Q), poly-(ethylenglycol) methylether acrylate (M-PEG-acrylate), and styrene in an organic solvent according to the method in the examples of U.S. Pat. No. 6,221,957.

TABLE 6

Dispersant polymers

Monomer composition (mole %)

| Example | DADMAC | ADAM MC Q | M-PEG acrylate | Styrene |
|---|---|---|---|---|
| 21 | 60 | 37.5 | 2.5 | 0 |
| 22 | 60 | 36.5 | 2.5 | 1 |
| 23 | 60 | 32.5 | 2.5 | 5 |

When testing these dispersants in the preparation of a dispersion according to Examples 10–18, a gel was formed in all cases. Thus, no useful dispersion was possible to prepare.

Example 24

The shelf life, measured as sedimentation stability, was tested for dispersions according to Examples 10, 14, 15 and 17. Samples of the dispersions were centrifuged for 30 minutes at 300 rpm. The amount of polymer sediment was determined for each sample.

TABLE 7

Sedimentation stability

| Polymer dispersion | Active content (%) | Amount polymer sediment (%) |
|---|---|---|
| Ex. 10 | 15 | 0 |
| Ex. 14 | 15 | 0 |
| Ex. 15 | 20 | 0 |
| Ex. 17 | 23 | <5 |

It is concluded that polymer dispersions with long shelf life can be obtained by the present invention, also at high active contents.

What is claimed is:

1. An aqueous polymer dispersion comprising:
   (a) a dispersed polymer, and, (b) a dispersant polymer which is a co-polymer of a monomer mixture (M) comprising at least one cationic vinyl monomer ($m_3$) and at least one monomer ($m_4$) which is tetrahydrofurfuryl acrylate, tetrahydrofurfuryl methacrylate, or a monomer of the general formula (I):

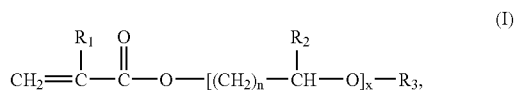

wherein $R_1$ is hydrogen or methyl, $R_2$ is hydrogen or $C_1$–$C_2$ alkyl, $R_3$ is hydrogen, $C_1$–$C_4$ alkyl, phenyl, or benzyl, n=1 to 4, and x=1 to 50, and, (c) a salt, the monomer mixture (M) including 0.5 wt % or less of monomers which are not soluble in water.

2. An aqueous polymer dispersion according to claim 1, wherein the dispersed polymer is a co-polymer of at least one first water-soluble monomer ($m_1$) of the general formula (II):

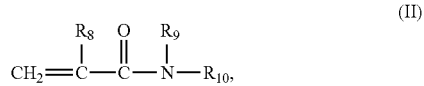

wherein $R_8$ is hydrogen or methyl, and $R_9$ and $R_{10}$ are, independently from each other, any of hydrogen, $C_1$–$C_2$ alkyl, or isopropyl, and at least one second water-soluble monomer ($m_2$) of the general formula (III):

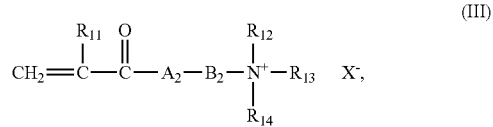

wherein $R_{11}$ is hydrogen or methyl, $R_{12}$, $R_{13}$ and $R_{14}$ are, independently from each other, any of hydrogen, $C_1$–$C_8$ alkyl or benzyl, $A_2$ is oxygen or NH, $B_2$ is $C_2$–$C_4$ alkyl or $C_2$–$C_4$ hydroxyalkyl, X is an anionic counterion.

3. An aqueous polymer dispersion according to claim 1, comprising:
   (a) from about 12 to about 25 weight % of the dispersed polymer, and,
   (b) from about 0.8 to about 1.5 weight % of the dispersant polymer, calculated as dry polymer.

4. An aqueous polymer dispersion according to claim 2, wherein the molar ratio between monomer(s) ($m_1$) and monomer(s) ($m_2$) is from about 92:8 to about 85:15.

5. An aqueous polymer dispersion comprising:
   (a) from about 12 to about 26 weight % of a dispersed polymer, which is a co-polymer of at least one first water-soluble monomer ($m_1$) of the general formula (II):

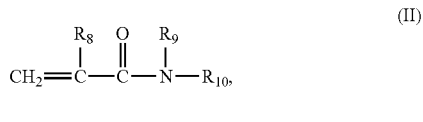

wherein $R_8$ is hydrogen or methyl, and $R_9$ and $R_{10}$ are, independently from each other, any of hydrogen, $C_1$–$C_2$ alkyl, or isopropyl, and at least one second water-soluble monomer ($m_2$) of the general formula (III):

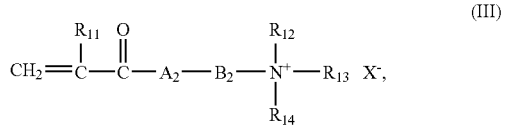

wherein $R_{11}$ is hydrogen or methyl, $R_{12}$ and $R_{13}$ are, independently from each other, any of hydrogen or $C_1$–$C_8$ alkyl, $R_{14}$ is benzyl, $A_2$ is oxygen or NH, $B_2$ is $C_2$–$C_4$ alkyl or $C_2$–$C_4$ hydroxyalkyl, X is an anionic counterion, and, (b) from about 0.8 to about 1.5 weight % of a dispersant polymer which is a co-polymer of a monomer mixture (M) comprising at least one cationic vinyl monomer ($m_3$) and at least one monomer ($m_4$) which is a monomer of the general formula (I):

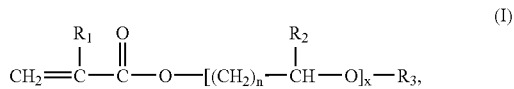

wherein $R_1$ is hydrogen or methyl, $R_2$ is hydrogen or $C_1$–$C_2$ alkyl, $R_3$ is hydrogen, $C_1$–$C_4$ alkyl, phenyl, or benzyl, n=1 to 4, and x=1 to 50, and, (c) a salt, the monomer mixture (M) including 0.5 wt % or less of monomers which are not soluble in water.

6. An aqueous polymer dispersion according to claim 5, which comprises from about 15 to about 35 weight % of a salt.

7. An aqueous polymer dispersion according to claim 1, wherein the dispersant polymer comprises (a) from about 90 to about 99 mole % of monomer(s) which is/are belonging to the group of cationic monomers ($m_3$), and, (b) from about 1 to about 10 mole % of monomer(s) ($m_4$).

8. An aqueous polymer dispersion according to claim 1, wherein the cationic vinyl monomer, ($m_3$), is diallyldimethylammonium chloride (DADMAC), vinylpyridinium chloride, N-vinylimidazoliniuim chloride, vinylbenzyltrimethylammonium chloride, or has the general formula (IV):

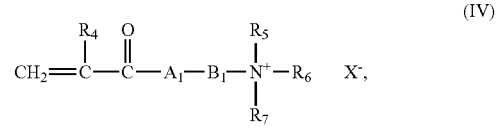

wherein $R_4$ is hydrogen or methyl, $R_5$, $R_6$ and $R_7$ are, independently from each other, any of hydrogen, $C_1$–$C_8$ alkyl, or, benzyl, $A_1$ is NH or oxygen, $B_1$ is $C_1$–$C_2$ alkyl or $C_1$–$C_2$ hydroxyalkyl, $X^-$ is an anionic counterion.

9. An aqueous polymer dispersion according to claim 1, wherein the dispersant polymer has a weight average molecular weight from about 100,000 to about 2,000,000 g/mole.

10. An aqueous polymer dispersion according to claim 1, wherein the concentration of salt is from about 15 weight % to about 35 weight %, based on the amount of water.

11. An aqueous polymer dispersion according to claim 1, wherein the monomer mixture comprises from 0 to about 0.1 weight % of monomers which are not soluble in water.

12. An aqueous polymer dispersion according to claim 5, wherein the dispersant polymer comprises (a) from about 90 to about 99 mole % of monomer(s) which is/are belonging to the group of cationic monomers ($m_3$), and, (b) from about 1 to about 10 mole % of monomer(s) ($m_4$).

13. An aqueous polymer dispersion according to claim 5, wherein the cationic vinyl monomer, ($m_3$), is diallyldimethylammonium chloride (DADMAC), vinylpyridinium chloride, N-vinylimidazoliniuim chloride, vinylbenzyltrimethylammonium chloride, or has the general formula (IV):

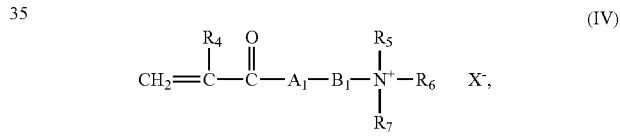

wherein $R_4$ is hydrogen or methyl, $R_5$, $R_6$ and $R_7$ are, independently from each other, any of hydrogen, $C_1$–$C_8$ alkyl, or, benzyl, $A_1$ is NH or oxygen, $B_1$ is $C_1$–$C_2$ alkyl or $C_1$–$C_2$ hydroxyalkyl, $X^-$ is an anionic counterion.

14. An aqueous polymer dispersion according to claim 5, wherein the dispersant polymer has a weight average molecular weight from about 100.000 to about 2.000.000 g/mole.

15. An aqueous polymer dispersion according to claim 5, wherein the monomer mixture comprises from 0 to about 0.1 weight % of monomers which are no soluble in water.

16. An aqueous polymer dispersion according to claim 1, wherein the monomer mixture (M) comprises up to about 0.1 wt % of monomers which are not soluble in water.

17. An aqueous polymer dispersion according to claim 5, wherein the monomer mixture (M) comprises up to about 0.1 wt % of monomers which are not soluble in water.

* * * * *